July 13, 1948. H. F. SMITH 2,444,958
FLUSH TANK VALVE
Filed June 30, 1943 5 Sheets-Sheet 1

INVENTOR.
HARRY FORD SMITH
BY
*Richey Watts*
ATTORNEYS

July 13, 1948.  H. F. SMITH  2,444,958
FLUSH TANK VALVE

Filed June 30, 1943  5 Sheets-Sheet 3

INVENTOR.
HARRY FORD SMITH
BY
Richey & Watts
ATTORNEYS

July 13, 1948.  H. F. SMITH  2,444,958
FLUSH TANK VALVE
Filed June 30, 1943  5 Sheets-Sheet 4

INVENTOR.
HARRY FORD SMITH
BY
Richey & Watts
ATTORNEYS

July 13, 1948. H. F. SMITH 2,444,958
FLUSH TANK VALVE

Filed June 30, 1943 5 Sheets-Sheet 5

INVENTOR.
HARRY FORD SMITH
BY
Richey Watts
ATTORNEYS

Patented July 13, 1948

2,444,958

UNITED STATES PATENT OFFICE 2,444,958

FLUSH TANK VALVE

Harry Ford Smith, Lexington, Ohio, assignor to Mansfield Sanitary Pottery, Inc., Perrysville, Ohio, a corporation of Ohio Application June 30, 1943, Serial No. 492,845

5 Claims. (Cl. 137—104)

This invention relates generally to the art of flush tank construction and is particularly concerned with new and improved ball cocks for wet type flush tanks.

Flush tanks originally had a few simple operating parts. However, the parts have progressively been increased in numbers and complexity to meet real or fancied problems, and some of the added parts have created new problems. As a result, present day flush tanks include a plurality of parts which can not be readily removed for cleaning, repair or replacement and, what is of great importance during the present hostilities, most of those parts are composed of metals which are not available at all or only in insufficient quantities.

The present invention aims to improve flush tank valve construction by eliminating many of the parts which are now common and by replacing the remaining parts with parts which may be made of materials other than metal, such as pottery or plastics which will meet all building code requirements and which may be easily and quickly removed for repair or replacement.

In the drawings accompanying and forming a part of this specification.

Figure 1:
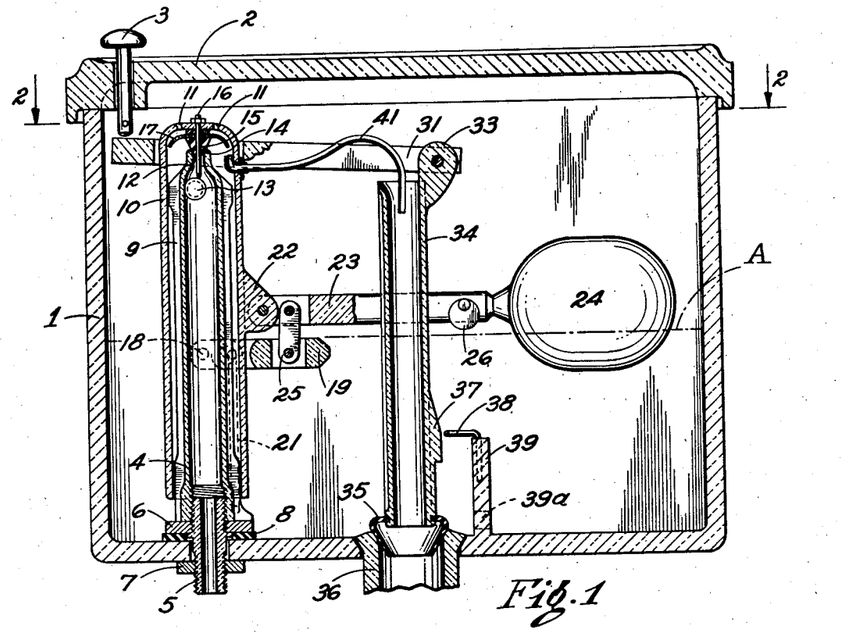
Figure 1 is a vertical, sectional view showing a flush tank equipped with one embodiment of the present invention.
Figure 2:
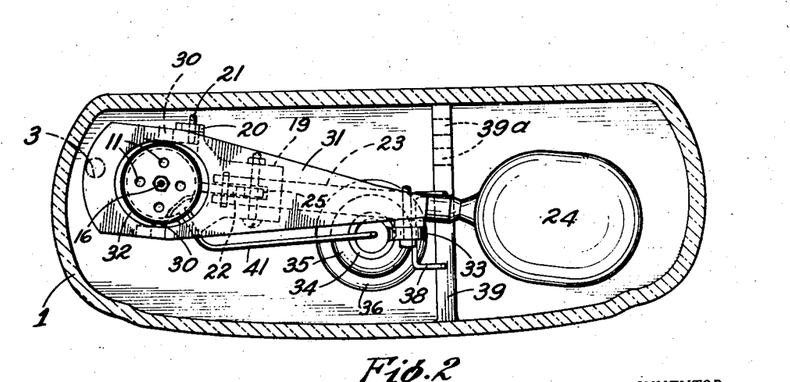
Figure 2 is a horizontal, sectional view taken on line 2—2 of Fig. 1.

The embodiment of the present invention which is shown in Figs. 1 and 2, comprises the usual tank 1 and detachable cover 2 with the top carrying a flushing plunger 3, and new and novel parts contained in the tank.

An inlet pipe 4 is connected thru the bottom of the tank to a source of water under pressure. This pipe 4, as shown, has screw-threaded engagement with a spud 5. Leakage of water out of the tank around the spud is prevented by nuts 6 and 7 which have screw-threaded engagement with the spud and compress a gasket 8 between the tank and nut 6. The inlet pipe 4 is cylindrical, has exterior ribs 9 to serve as positioning guides for hush pipe 10 which is telescoped over inlet pipe 4 and has a top end which is closed, except for air inlet openings 11. Near its open upper end inlet pipe 4 is restricted in diameter and is provided with an inner seat 12 for an inner float ball valve 13, and at its open end is provided with a seat 14 for an outer valve 15, which in this instance is conical in shape. The hush pipe 10 carries a stud 16 which projects thru valve 15 and far enough down inlet pipe 4 to displace inner valve 13 from its seat when valve 14 is seated. A water deflector 17 is also mounted on stud 16 within hush pipe 10. This deflector is in the shape of a disk with its outer marginal portion bent downwardly in a manner and for a purpose presently to be described. On opposite sides of the hush pipe 10 are substantially diametrically opposed trunnions 18 to which is pivoted the bifurcated end of a lever 19. This lever carries an adjustable cam 20 from which a rod 21 extends downwardly and at its lower end is provided with a laterally extending portion which seats in a recess in the lower part of inlet pipe 4. The hush pipe 10 has an integral ear 22 to which is pivoted a float lever 23, at the free end of which a float ball 24 is attached. Levers 19 and 23 are pivotally connected by link 25. Float lever 23 carries near float 24 an adjustable cam 26 for a purpose presently to be described.

Near the upper end of hush pipe 10 substantially diametrically opposite trunnions 30 extend outwardly to form pivots for the flush valve actuating lever 31. This lever is provided with an opening 32 which is of sufficiently large diameter to receive hush pipe 10 and to have limited pivoting movement about trunnions 30 without interference from the hush pipe. This lever 31 is engageable with the flushing plunger for pivoting action about trunnions 30. At its opposite end lever 31 is pivoted to an ear 33 which is integral with overflow pipe 34 at the lower end of which flush valve 35 is carried and positioned to seal the outlet opening from the tank, which in this instance is provided with a tubular spud 36 having a seat at its upper end for valve 35. The overflow pipe 34 has near its lower end a detent 37 which is engageable with a detent support 38 carried by a weir 39 which extends across the interior of the tank and for a short distance above the bottom wall thereof and is provided with one or more holes 39a extending therethru.

The refill pipe 41 leads from the upper end of hush pipe 10 just below deflector 17 into the overflow pipe 34.

The apparatus of Figs. 1 and 2 operates substantially as follows, assuming that there is liquid in the tank to the level indicated at A and the parts are in the positions shown which they occupy just prior to the operation of flushing the tank: When the flushing plunger 3 is pushed downwardly it engages lever 31 and pivots it about trunnions 30. As the lever is thus pivoted it lifts flush pipe 34 vertically and swings it laterally due to the fact that the pivotal connection between lever 31 and ear 33 is eccentric to the center of gravity of the pipe 34. This lifting and swinging action brings detent 37 over detent support 38 and when pressure is released from plunger 3 the overflow pipe 34 descends until detent 37 rests on support 38. The water rushing out of tank 1 will not be able to draw flush valve 35 back unto its seat in the outlet opening from the tank. As the liquid level falls float 24 follows it down, thereby pivoting lever 23 about its pivotal connection to ear 22 of hush pipe 10, forcing lever 25 downwardly and thereby pivoting lever 19 about its connection to rod 21 which absorbs in compression the forces so applied. As lever 19 pivots about its connection to rod 21, hush pipe 10 is lifted by trunnions 18 and carries upwardly with it valve 15, thus opening the upper end of inlet pipe 4 and permitting water under pressure to flow out of the inlet pipe along the sides of valve 15. As valve 15 and stud 16 move upwardly they define in the open end of inlet pipe 4 an annular space thru which the water may flow. The water so flowing is diverted outwardly by the conical surfaces of valve 15 and is intercepted by deflector 17. These conical surfaces resolve the force of the water into an axial component and a radial component toward the axis of the stream. The water which is intercepted by the deflector is directed outwardly against the downwardly curving peripheral portions of the deflector where the force of the water is again resolved into axial and radial components, the latter being directed away from the axis of the flowing water. Since the angle of deflection of the outwardly deflecting conical surfaces on the valve 15 is less than the angle of deflection of the inwardly deflecting surfaces of the deflector, the radial components of force away from the center are greater than those toward the center of travel of the water out of the inlet pipe 4.

As a result of this resolution of forces the valve 15 and its stud 16 are maintained in a centrally disposed position relative to the outer valve seat of inlet pipe 4, and the annular space thru which the water flows is maintained substantially constant in its various radial dimensions. It will be understood that any tendency of the valve to move laterally along one radius would, under ordinary circumstances, be progressively increased with progressive decrease in the radial length of the diametrcal opposite portion of the annular space. However, when any such tendency to radial movement occurs with the above described device the increased volume of water which flows thru the enlarged space on a given radius exerts a correspondingly increased force on the peripheral portion of the deflector on the same radius and tends to move the valve outwardly along that radius, thereby decreasing the radial length of the annular space and thereby restoring the valve to its centrally disposed position relative to said seat, and maintaining the radial lengths of the annular space substantially constant at all times.

As the water level in tank 1 falls the float 24 follows it down, but near the lower end of its stroke the movement of the float is retarded by the liquid level back of weir 39, since the water back of the weir can escape only thru the hole or holes 39a. This retarding is sufficient for substantially all the water to flow out of the tank on the other side of the weir before the overflow pipe 34 is dislodged from the detent support 38. The cam 26 is adjusted so that it engages with the detent 37 at or shortly after the time the level of liquid in the tank falls to the top of weir 39. As the liquid level back of weir 39 falls by the flow of water thru holes 39a cam 26 slowly moves detent 37 off its support 38 whereupon the overflow pipe 34 and flush valve 35 move downwardly and the latter seats in the outlet opening of the tank. With the outlet thus closed the water level in the tank rises, lifting float 34 and lowering valve 15 toward its seat and finally seating it thereby interrupting the flow of water into the tank thru inlet pipe 4.

It will be understood that all during the time the valve 15 is in unseated position on its seat the flow of air thru opening 11 in the upper end of hush pipe 10 is induced by the flow of water across the annular space between the outer margin of deflector 17 and the inner surface of hush pipe 10. Such flow of air insures the presence of air around the discharge end of the inlet pipe at all times. From the foregoing description it will be understood that during the downward movement of the float lever 23 and float 24 the inlet valve is opened and later the flush valve is closed and that on the upward movement of the lever and float the inlet valve is closed.

The apparatus shown in Figs. 1 and 2 and described above can be made from different materials. For example, the levers 19, 23, 25 and 31 may be made of wood, plastics or any other suitable material. The inlet pipe 4, hush pipe 10 and overflow pipe 34 may be made of metal, pottery or any other suitable materials. The deflector 17 may be made of metal, plastics or any other material which possesses the necessary strength and rigidity. In short, substantially all war critical materials may be eliminated by the present invention.

It will also be noted that the parts shown in Figs. 1 and 2 may be assembled and disassembled easily and without the use of special tools. The overflow pipe 34, flush valve 35 and lever 31 may be removed from the tank as a unit simply by lifting them out of the tank. Hush pipe 10 and associated levers 19, 23 and 25 and float 24 may be removed as a unit simply by disengaging rod 21 from its recess and lifting the parts out of the tank. When these parts are removed it is unnecessary to shut off the source of water to inlet pipe 4 for when hush pipe 10 is lifted far enough so that stud 16 is out of engagement with ball valve 13 the latter will seat at the upper end of the inlet pipe and seal it against the flow of water thru the open upper end thereof.

Figure 3:
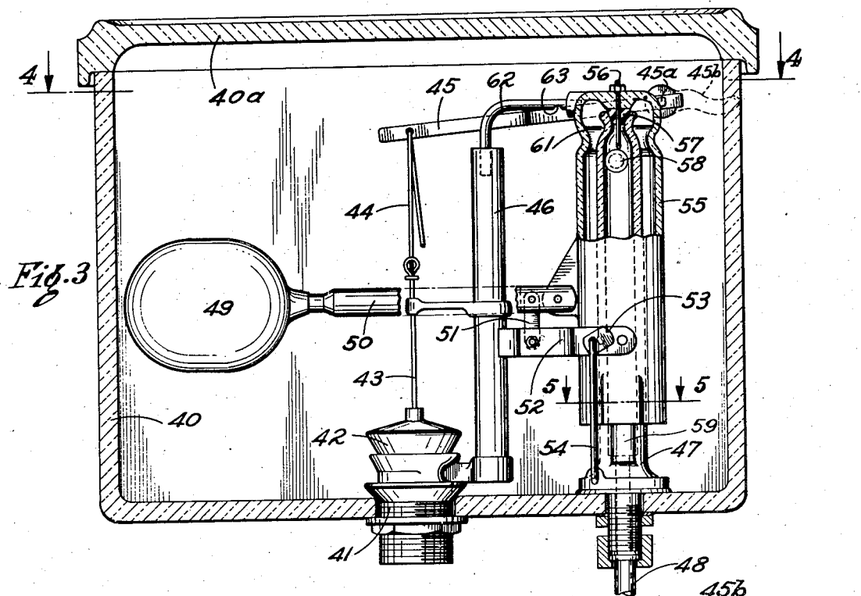
Figure 3 is a view similar to Fig. 1 but showing a modified form of apparatus embodying the present invention.
Figures 4, 5:
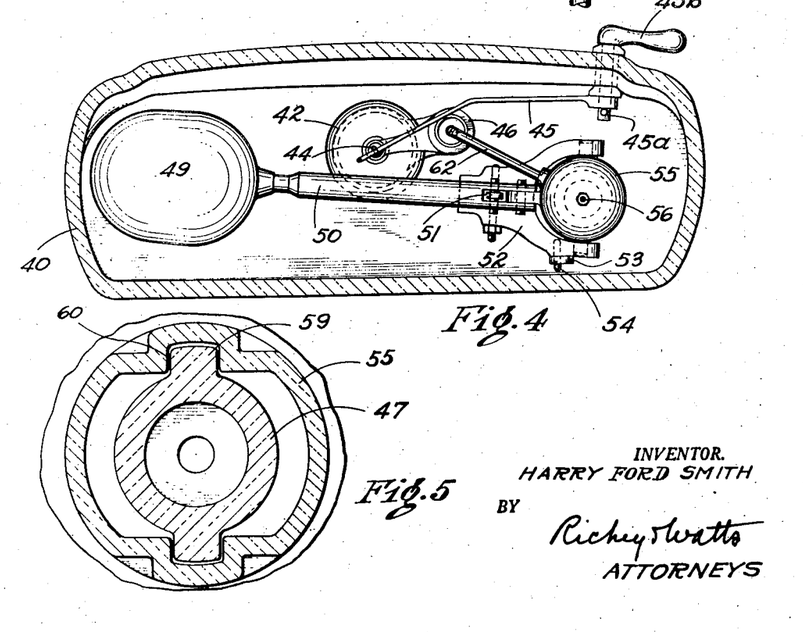
Figures 4 and 5 are horizontal, sectional views taken, respectively, on lines 4—4 and 5—5 of Fig. 3.

In Figs. 3, 4 and 5 a modified form of the apparatus embodying the present invention is shown. In these figures a conventional flush tank is shown at 40 and the cover therefor, at 40a. The tank is provided with the ordinary flush outlet spud 41 and flush valve 42 connected to a rod 43 which is fastened to another rod 44 connected to a lever 45 which is mounted on a shaft 45a to which is secured a flushing lever 45b. An overflow pipe 46 opens into the spud 41 below flush valve 42.

The inlet pipe 47 corresponds generally to the inlet pipe 4 of Figs. 1 and 2 and is suitably connected to pipe 48 which is in communication with a source of water under pressure. Float 49, float lever 50, link 51, lever 52, cam 53 and rod 54 correspond generally to the parts 24, 23, 25, 19, 20 and 21 respectively of Figs. 1 and 2. Hush pipe 55, stud 56, valves 57 and 58 correspond generally to parts 10, 16, 15 and 13 of Figs. 1 and 2.

In the modification of Figures 3, 4 and 5 the inlet pipe is provided with opposite external ribs 59 to seat in correspondingly shaped and located recesses 60 in the interior of the hush pipe 55. The hush pipe 55 is so shaped at its upper end as to make unnecessary the use of a separate deflector such as part 17 of Figs. 1 and 2. In this instance the inner surface of the hush pipe is curved downwardly and inwardly as is indicated at 61, and such curvature serves to resolve the force of the water into the radial outward components described above in connection with Figs. 1 and 2, so that as a result the valve 57 is maintained in position substantially central with respect to the valve seat.

A refill pipe 62 extends from the interior of the upper end of hush pipe 55 into the top of overflow pipe 46. This pipe 62 is provided with an opening 63 thru its wall to admit air into the hush pipe under the inducing action of water which is directed downwardly by the curved surfaces at 61 and thence across onto the outer surface of inlet pipe 47.

The inlet pipe of Figs. 3 to 5 and its associated parts may be made of the various materials mentioned above in connection with corresponding parts shown in Figs. 1 and 2 and they may be assembled and disassembled in substantially the same manner as has been described in connection with Figs. 1 and 2. Furthermore, the operation of the device of Figs. 3 to 5 is substantially the same as that previously described except insofar as that operation is modified by the presence of the ordinary flush valve 42 and parts associated therewith.

Figure 6:
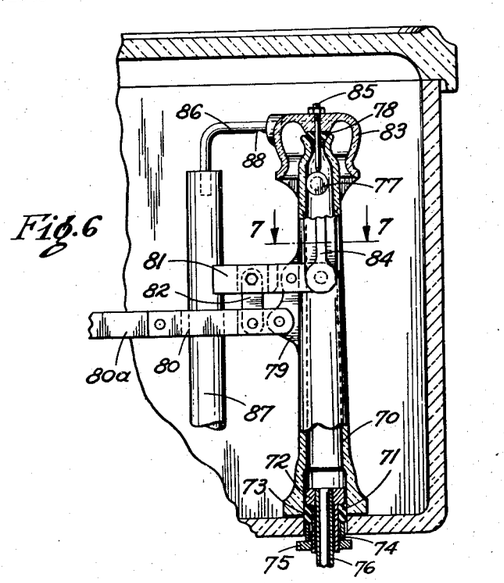
Figure 6 is a vertical, sectional, fragmentary view showing another form of inlet pipe and associated parts embodying the present invention.
Figures 7, 14:
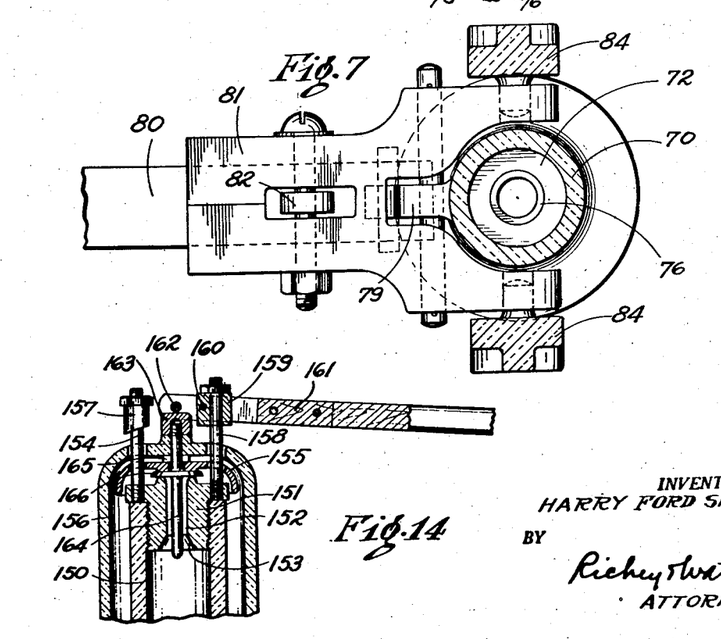
Figure 7 is a horizontal, cross-sectional view taken on line 7—7 of Fig. 6.
Figure 14 is a fragmentary, vertical, sectional view of another modified form of inlet pipe and associated parts.

In Figs. 6 and 7 is disclosed a modification of the structures of the inlet and hush pipes and associated parts of Figures 1 to 5. In Figs. 6 and 7 the inlet pipe 70 is tubular and is positioned and sealed against leakage at its lower end by any suitable means. The means shown comprises a packing 71 disposed between the shouldered end 72 of a tube 73 and a ring 74 which bears against the packing 71 and against a nut 75 threaded onto the tube 73. When nut 75 is threaded onto tube 73 the packing 71 may expand out into positioning and sealing engagement with the interior surface of inlet pipe 70. A water inlet pipe 76 may be screw-threaded into the shouldered end 72 of tube 73. As in Figs. 1 to 5, the inlet pipe 70 is provided with an inner seat for float ball valve 77 and with an outer seat for outer valve 78. The inlet pipe 70 is provided with an ear 79 to which is pivoted a float carrying lever 80 and also another lever 81, these two levers being linked together by link 82. Lever 80 may include an adjustably pivoted part 80a to permit the float ball to be set higher in the tank than the elevation of the floats in Figs. 1 to 5.

The hush pipe 83 is relatively short in axial direction as compared with the hush pipes 10 and 55 of previously described figures, that is, most of the skirts of those hush pipes have been eliminated leaving oppositely and downwardly extending portions 84 to which lever 81 is pivoted. The hush pipe 83 telescopically encloses the upper end of inlet pipe 70, carries a stud 85 which corresponds to studs 16 and 56 of Figs. 1 and 3 respectively and projects into inlet pipe 70 far enough to prevent the seating of float ball 77 when the valve 78, which is mounted on stud 85, is in position to seal the outlet end of pipe 70 or to permit water to flow thru said end in a normal operation of the device. A refill pipe 86 leads from the interior of hush pipe 83 into the upper end of overflow pipe 87 and is provided with an air inlet 88. This pipe 86 corresponds to pipe 62 of Fig. 3. The inner surface of hush pipe 83 is so shaped that water flowing out of the upper end of inlet pipe 70 and deflected outwardly by valve 78 will be deflected downwardly and inwardly against the outer surface of pipe 70. The angles of deflection of valve 78 and the inner surfaces of pipe 83 are so proportioned that the radially outward components of force of the annular stream of water will exceed the radially inward components and thereby maintain the stud 85 and valve 78 in a central position relative to the outlet end of pipe 70, in the manner described hereinabove in connection with Figs. 1 to 5 inclusive.

The construction of the parts shown in Figs. 6 and 7 and described hereinabove, and the operation of those parts is substantially the same as the construction and operation of the corresponding parts in Figs. 1 to 5.

Figure 8:
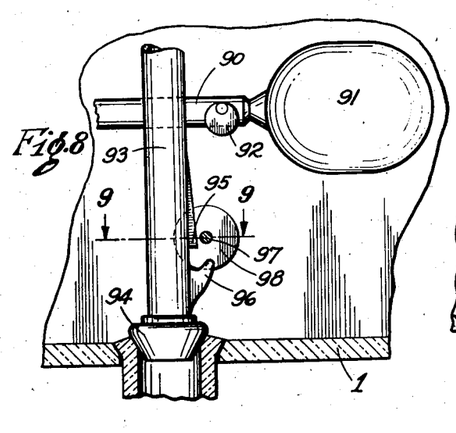
Figure 8 is a fragmentary, side elevational view of a modified form of overflow pipe and its latching and unlatching mechanism.
Figure 9:
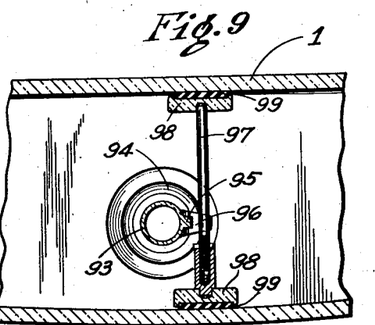
Figure 9 is a horizontal, sectional view taken on line 9—9 of Fig. 8.

In Figs. 8 and 9 is shown a modification of detent and detent support of Figs. 1 and 2. In these figures the float lever 90 carries a float ball 91 and an adjustable cam 92. The flush pipe 93 which carries a flush valve 94 at its lower end is provided with a detent 95 and a detent seating lug 96. The detent support comprises a two-part, screw-threaded rod 97 which can be lengthened axially and pressed against blocks 98 having flexible facings 99 which can thus be pressed into place against the inner surfaces of the tank. This detent support is so positioned relative to flush pipe 93 that when the latter is lifted and swung laterally the lug 96 will engage the detent support 97 and direct the flush pipe laterally to bring the detent 95 above the support 97. The detent 95 will rest on the support until it is dislodged therefrom by the cam 92 when the lever 90 descends during the time water is flowing out of the tank.

Figure 10:
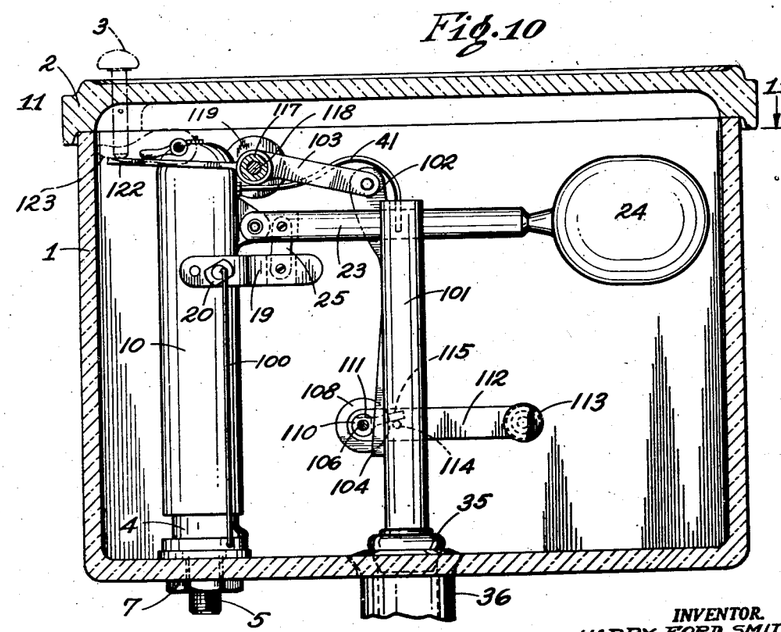
Figure 10 is a side elevational view of another form of the invention, partly in section.
Figure 11:
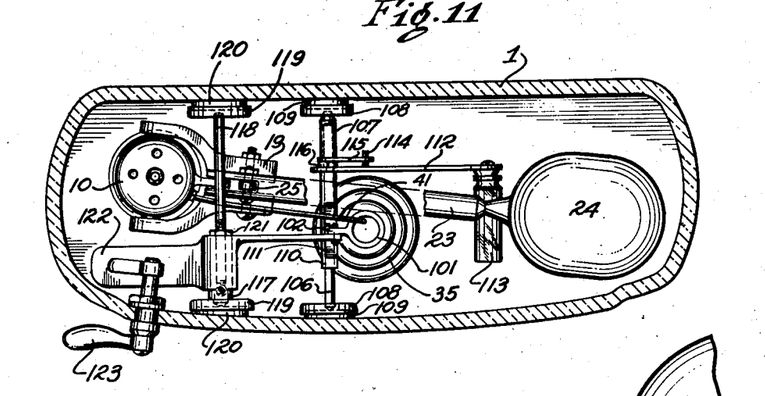
Figure 11 is a horizontal, sectional view taken on line 11—11 of Figure 10.

In Figs. 10 and 11 are shown embodiments of the invention shown in preceding figures. These figures show a tank 1 and cover 2 corresponding to similarly numbered parts of Figs. 1 and 2. It also shows an inlet pipe 4, a hush pipe 10, lever 19, cam 20, lever 23, float 24, link 25 corresponding to similarly numbered parts of Figs. 1 and 2, and refill pipe 41. Rod 100 corresponds to rod 21 of Fig. 1 but is longer because the lever 19 is located higher up on hush pipe 10 than is the case in Fig. 1. In this connection it will be understood that the location of the levers 19 and 23 of Fig. 1 and 50 and 52 of Fig. 3, and also levers 80 and 81 of Fig. 6 may be located at any desired elevation within the tank and in case these levers in Figs. 1 and 3 are not so adjusted that the floats 24 or 49 would be at the desired level of liquid in the tank, those levers may be made in two parts, hinged together as is shown at 80a in Fig. 6 where the lever 80 comprises a part pivoted thereto and capable of limited adjustment relative thereto.

In Figs. 10 and 11 the overflow pipe 101 is provided at its lower end with a flush valve 35 like the correspondingly numbered part of Fig. 1 and at its upper end has an ear 102 offset on the side thereof near the hush pipe 10. A lever 103 is pivoted to ear 102 at a point eccentric to the center of gravity of pipe 101 so that when that pipe is lifted it will swing laterally toward the left about that pivoted connection, thereby bringing detent 104 above a detent support 111. This detent support comprises an axially expansible member composed of rod 106 and sleeve 107 which can be pressed against opposed blocks 108 faced with flexible material 109, thereby clamping those blocks against the inner surface of the tank. A sleeve 110 is rotatably mounted on rod 106 and is provided with a normally horizontal surface 111 which is adapted to be engaged by the lower surface of detent 104 when overflow pipe 101 is lifted and swung as above described. An arm 112 mounted on the detent support for rotation with sleeve 110 carries at its free end a float 113. It will be understood that when the liquid level in tank 1 falls when the valve 35 is lifted off its seat, the float 113 will move down with the level of liquid in the tank and as it does so it will rotate sleeve 110, thereby tilting surface 111 and permitting the detent 104 to slide over that surface and thereby release the detent with resultant return of the overflow pipe to its normal sealing position. When the flush valve 35 is reseated and the level of water rises in the tank the float 113 is lifted until a stop 114 thereon comes into engagement with an arm 115 which is clamped in adjusted position against sleeve 107 by nut 116.

The lever 103 is pivoted on a sleeve 117 which is screw-threaded to a rod 118. These two parts are axially expansible and are maintained in position in the tank by being expanded against blocks 119 having flexible facings 120, these blocks and facings resembling those of Figures 8 and 9. Nut 121 prevents endwise movement of lever 3 upon sleeve 117 in one direction. An extension 122 of lever 103 is engageable with the ordinary flushing device including handle 123. Alternatively, a flushing plunger 3 may be substituted for the flushing device 123, if desired.

Figures 12, 13:
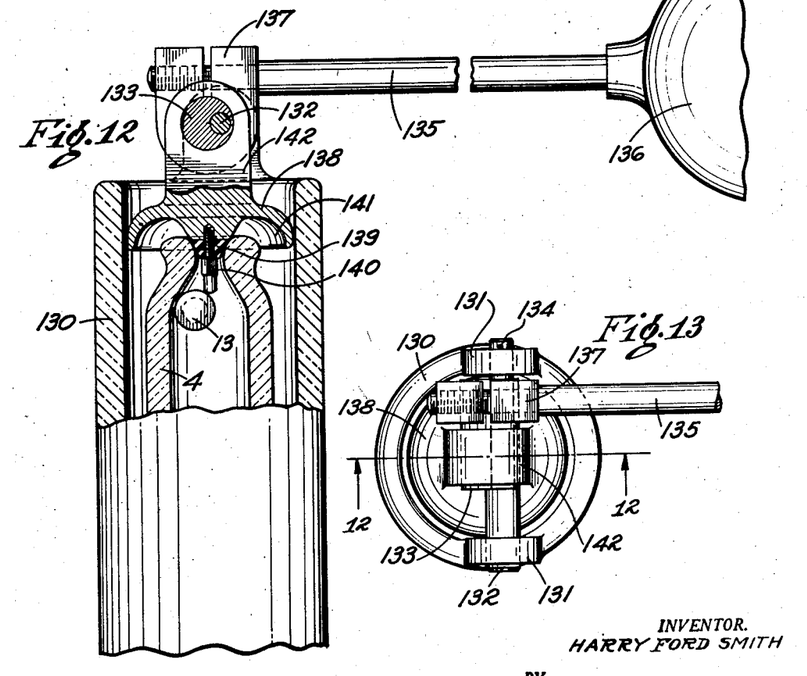
Figure 12 is a fragmentary, vertical, sectional view of a modified form of inlet pipe and associated parts taken on line 12—12 of Figure 13.
Figure 13 is a fragmentary, top plan view of the apparatus of Figure 12.

In Figures 12 and 13 is shown a modified form of hush pipe and deflector. In this instance the inlet pipe 4 and ball valve 13 are like correspondingly numbered parts of Fig. 1. Hush pipe 130 is a cylinder open at its upper end and with the lower end supported in any suitable manner, (not shown) so that water can flow freely therethrough and out at said lower end. At its upper end pipe 130 has two upstanding lugs 131 which are apertured to receive a pin 132. One end of the pin is larger in diameter than the other end and on the smaller diameter part carries a sleeve 133 which is rotatable relative thereto and which abuts at one end against the larger part of the pin 132 and at the other end is close to the inner side of the lug 131. A pin 134 prevents endwise movement of the pin 132 in one direction, the sleeve 133 preventing endwise movement of the pin in the opposite direction. A float lever 135 carries a float ball 136 at one end and at the other end is secured to a U-shaped clamp 137 which is clamped around one end of sleeve 133 to rotate therewith.

A deflector is disposed within the upper end of pipe 130. This deflector comprises a disk part 138 which carries a valve 139 and a stud 140. The valve and stud correspond in position and operation to parts 15 and 16 of Fig. 1. The peripheral portions of the deflector are bent downwardly with an inner surface 141 so shaped as to resolve the force of a stream of an annular stream of water passing out of pipe 4 around valve 139 into components including radially outward components which are greater than radially inward components resolved by valve 141. The outwardly and downwardly curving surfaces 141 operate to maintain the valve 139 in a centrally disposed position relative to the outlet valve seat of pipe 4 as has been previously described in some detail in connection with the apparatus of Figs. 1, 3 and 6. A lug 142 extends upwardly from the top of deflector disk 138 and has a circular opening to receive sleeve 133 which may rotate relative thereto. It will be understood from the foregoing description that when float 136 falls with the level of liquid in a tank equipped with apparatus of Figs. 12 and 13, the sleeve 133 will rotate around rod 131 and, due to the fact that the sleeve is eccentrically mounted on the rod, the sleeve will lift the deflector thereby unseating valve 139 and permitting water to flow thru the valve opening. Water flowing out of pipe 4 thru the annular space between the valve and the pipe will be deflected outwardly and then downwardly and inwardly with the result, as above explained, that the valve will be maintained centrally in the pipe. The flow of water from the lower edge of surface 141 and across the intervening space to the inner surface of pipe 130 will induce a flow of air into the space beneath disk 138 and around the open end of pipe 4, thereby maintaining atmospheric pressure at that place at substantially all times during the flow of water out of the pipe 4.

In Figure 14 is shown another modified form of hush pipe deflector and associated parts. In this instance the inlet pipe 150 is a plain cylindrical tube with suitable connections (at its lower end) to a source of water under pressure and at its upper end has a plug 151 screw-threaded therein. This plug 151 has a central passage 152 provided with an inner seat 153 for an inner float ball (not shown) corresponding to ball 13 of Fig. 1. Stud 154, attached to plug 151, extends thru openings in deflector 155 and hush pipe 156 and at its upper end carries a stop 157 which limits the upward movement of hush pipe 156. Another stud 158 extends from plug 151 thru openings in the deflector and hush pipe and near its upper end carries a sleeve 159 which is slidable endwise thereof and which is attached as by pin 160 to float lever 161. The pin 160 acts as a fulcrum point about which lever 161 pivots. A pin 162 is positioned to engage a cap 163 which bears against the top of pipe 156 and has screw-threaded engagement with a rod 164. This rod extends from cap 163 thru the end of pipe 156 thru a washer 165 and deflector 155. Inside deflector 155 rod 164 is provided with a valve 166 which is adapted to seal the passage 152 against flow of water out of inlet pipe 150 and also to hold deflector 155 and gasket 165 in assembled position relative to hush pipe 156. The lower end of rod 164 is smaller in diameter than passage 152 and extends to a point far enough below the inner seat 153 to prevent the seating thereagainst of the float ball (not shown) during normal operation of the device.

The deflector 155 operates in substantially the same manner as the deflectors of Figs. 1, 3, 6 and 12. Since the valve 166 is at substantially right angles to the center of direction of flow of water thru passage 152, the action of the valve is somewhat different from the action of the conically shaped valves such as 15 of Fig. 1, for substantially none of that force is resolved into radially inward components. The radially outward components of force of the flowing water which are resolved by the deflector 155 serve to maintain the valve in a position substantially central to the flow of water thru passage 152. The water leaving deflector 155 and passing to the outer surface of pipe 150 or the inner surface of pipe 156, as in the above described modifications, serves to induce a flow of air thru the openings around studs 154 and 158 and thereby to maintain atmospheric pressure within deflector 155 and around outlet end of passage 152.

The operation of the apparatus of Fig. 14 is substantially as follows: When the flush valve (not shown) is lifted and the level in the tank (not shown) falls, the float (not shown) on float lever 161 lowers, pivoting the lever about pin 160 and thereby moving pin 162 upwardly. This permits the water pressure in pipe 150 to lift valve 166 together with the deflector 155 and pipe 156. As the float lever continues to pivot about pin 160 these parts may rise to higher levels determined by the position of pin 162 until the end of pipe 156 comes into contact with stop 157, which prevents further rising movement of these parts. It will be understood that stop 157 may be adjusted on stud 154. When the water level rises in the tank and lifts the float and float lever 161, the lever is pivoted in the opposite direction about pin 160, and pin 162 bears against cap 163, thereby forcing pipe 156, deflector 155 and valve 166 downwardly until the valve seats on plug 151 and seals passage 152 against further flow of water therethru. It will be understood that the sleeve 159 on stud 158 may be adjusted up or down to control the extent of movement of the valve, deflector and hush pipe.

It will be understood that the reason for admitting air to the top of the hush pipe is to prevent the possibility of water being siphoned out of the tank and into the water system in the event the pressure on the supply line should become negative at any time. The means for admitting air for that purpose has been described hereinabove and includes openings 11 in Fig. 1; opening 63 in Fig. 3; opening 88 in Fig. 6; the annular space around disk 138 of Fig. 13; and openings in deflector 155 around studs 154 and 158 in Fig. 14.

The purpose of the weir 39 in Figs. 1 and 2 is to permit the trap in the flush bowl to refill after flushing when, as in the modification of those figures, the conventional refill tube is omitted.

It will be understood that other modifications of the present invention may be made by those skilled in the art without departing from the spirit and scope of this invention.

Having thus described my invention so that others skilled in the art may be able to understand and practice the same, I state that what I desire to secure by Letters Patent is defined in what is claimed.

What is claimed is:

1. A valve device comprising a substantially vertical pipe for liquid having a valve seat at its upper open end, a valve structure axially and radially movable relative to said seat and including a portion to seat on said seat and seal the pipe against outflow of liquid and a portion disposed in the pipe and defining with the inner surfaces thereof an annular space through which liquid may flow when the valve structure is off its seat, and means to maintain said valve structure in centrally disposed position relative to said seat during the flow of liquid from said pipe, said means including a hush pipe surrounding said inlet pipe and provided with an opening at its upper end for admission of air when the liquid is flowing, and surfaces within said hush pipe positioned to intercept liquid discharged from said annular space, said surfaces being shaped and disposed to deflect such a liquid radially outward and then radially inward in the hush pipe relative to the center of travel of the liquid through said annular space, the angle of deflection of the outwardly deflecting surface being less than that of the inwardly deflecting surface whereby the radial components of force of the flowing liquid from said center of travel are greater than those toward said center.

2. A valve device comprising a substantially vertical pipe for liquid having a valve seat at its upper open end, a valve structure axially and radially movable relative to said seat and including a portion to seat on said seat and seal the pipe against outflow of liquid and a portion disposed in the pipe and defining with the inner surfaces thereof an annular space through which liquid may flow when the valve structure is off its seat, and means to maintain said valve structure in centrally disposed position relative to said seat during the flow of liquid from said pipe, said means including a hush pipe surrounding said inlet pipe and provided with an opening at its upper end for admission of air when the liquid is flowing, means including a float and float lever cooperating with said valve structure to move said valve toward and away from said seat, and surfaces within said hush pipe positioned to intercept liquid discharged from said annular space, said surfaces being shaped and disposed to deflect such liquid radially outward and then radially inward in the hush pipe relative to the center of travel of the liquid through said annular space, the angle of deflection of the outwardly deflecting surface being less than that of the inwardly deflecting surface whereby the radial components of force of the flowing liquid from said center of travel are greater than those toward said center.

3. A valve device comprising a substantially vertical pipe for liquid having outer and inner valve seats at its upper open end, an inner valve within the pipe to seat on the inner seat, a valve structure axially and radially movable relative to said pipe and including a portion to seat on said outer seat and seal the pipe against outflow of liquid, a portion to maintain the inner valve off its seat when the outer valve is seated, and a portion disposed in the pipe and defining with the inner surfaces thereof an annular space through which liquid may flow when the valve structure is off its seat, and means to maintain said valve structure in centrally disposed position relative to said seat during the flow of liquid from said pipe, said means including a hush pipe surrounding said inlet pipe and provided with an opening at its upper end for admission of air when the liquid is flowing, and surfaces within said hush pipe positioned to intercept liquid discharged from said annular space, said surfaces being shaped and disposed to deflect such liquid radially outward and then radially inward in the hush pipe relative to the center of travel of the liquid through said annular space, the angle of deflection of the outwardly deflecting surface being less than that of the inwardly deflecting surface whereby the radial components of force of the flowing liquid from said center of travel are greater than those toward said center.

4. A valve device comprising a substantially vertical pipe for liquid having a valve seat at its upper end, a valve structure movably longitudinally and transversely relative to said pipe and including a portion to seat on said seat and seal the pipe against outflow of liquid, and a portion disposed in the pipe and defining with the inner surfaces thereof an annular space through which liquid may flow when the valve structure is off its seat, and means to maintain said valve structure in centrally disposed position relative to said seat during the flow of liquid from said pipe, said means including a hush pipe surrounding said inlet pipe and provided with an opening at its upper end for admission of air when the liquid is flowing, and surfaces within said hush pipe positioned to intercept liquid discharged from said annular space and shaped to deflect such liquid radially outward and then downwardly in the hush pipe and thereby to resolve the force of the flowing liquid into inwardly and outwardly directed radial components, the angle of deflection of the outwardly deflecting surface being less than that of the downwardly deflecting surface whereby the outwardly directed radial components of force of the flowing liquid are greater than the inwardly directed radial components.

5. A valve device comprising a substantially vertical liquid carrying inlet pipe having an open top end provided with a valve seat, an outer pipe around and spaced from said inlet pipe and having an air inlet opening at its upper end, a valve within said outer pipe movable longitudinally and transversely of said inlet pipe and having a surface to seat on said valve seat, and means movable as a unit with said valve and utilizing forces of liquid flowing out of said inlet pipe to maintain said valve centrally of said inlet pipe, said means comprising a member extending down into said inlet pipe to define therewith an annular space for liquid flow, and a deflector disposed to intercept liquid flowing from said space and shaped to deflect such liquid outwardly and downwardly in said outer pipe, said means being freely movable by the flowing liquid laterally in the direction of greatest volume of flow from said annular space with coincident movement of said member radially in the inlet pipe and resultant decrease in the volume of flow in said direction.

HARRY FORD SMITH.

REFERENCES CITED

The following references are of record in the file of this patent:

UNITED STATES PATENTS

| Number | Name | Date |
| --- | --- | --- |
| 363,166 | Platt | May 17, 1887 |
| 696,424 | Emory | Apr. 1, 1902 |
| 974,246 | Donnelly | Nov. 1, 1910 |
| 977,807 | Land | Dec. 6, 1910 |
| 1,368,884 | Bozeman et al. | Feb. 15, 1921 |
| 2,187,787 | Kinzie | Jan. 23, 1940 |
| 2,290,145 | Owens | July 14, 1942 |
| 2,312,654 | Langdon | Mar. 2, 1943 |
| 2,318,978 | Tow | May 11, 1943 |
| 2,329,337 | Criss | Sept. 14, 1943 |

FOREIGN PATENTS

| Number | Country | Date |
| --- | --- | --- |
| 779 | Great Britain | Mar. 18, 1867 |
| 2,223 | Great Britain | Aug. 24, 1871 |
| 416,169 | France | Oct. 13, 1910 |